United States Patent [19]

Takata et al.

[11] Patent Number: 5,496,228

[45] Date of Patent: Mar. 5, 1996

[54] EVAPORATED FUEL CONTROL SYSTEM FOR AN INTERNAL COMBUSTION ENGINE RESPONSIVE TO TORQUE REDUCTION DURING SHIFTING

[75] Inventors: Tetsuya Takata, Aki; Kazuo Niide, Hiroshima, both of Japan

[73] Assignee: Mazda Motor Corporation, Hiroshima, Japan

[21] Appl. No.: 186,162

[22] Filed: Jan. 25, 1994

[30] Foreign Application Priority Data

Jan. 29, 1993 [JP] Japan ................. 5-014304

[51] Int. Cl.$^6$ ................. F02N 25/00
[52] U.S. Cl. ................. 477/107; 477/110; 123/520; 180/197
[58] Field of Search ................. 477/109, 110, 477/111, 107; 123/520, 481, 423; 180/197

[56] References Cited

U.S. PATENT DOCUMENTS

| | | | |
|---|---|---|---|
| 4,381,753 | 5/1983 | Yuzawa et al. | 477/111 X |
| 4,823,642 | 4/1989 | Iwaki et al. | 477/111 |
| 4,951,773 | 8/1990 | Poirier et al. | 180/197 |
| 5,036,728 | 8/1991 | Kawasoe et al. | 477/109 |
| 5,085,194 | 4/1992 | Kuroda et al. | 123/520 X |
| 5,086,667 | 2/1992 | Katayama et al. | 477/111 |
| 5,368,002 | 11/1994 | Hoshino et al. | 123/520 |
| 5,377,644 | 1/1995 | Krohm | 123/520 |

FOREIGN PATENT DOCUMENTS 4-136469   1/1992   Japan .

*Primary Examiner*—Khoi Q. Ta
*Attorney, Agent, or Firm*—Fish & Richardson

[57] ABSTRACT

An evaporated fuel control system for use with an internal combustion engine having a cylinder, a fuel supply system for supplying fuel into the cylinder, and a torque down control device for executing torque down control at a predetermined condition, the evaporated fuel control system includes: an evaporated fuel supply system for trapping fuel evaporated from the fuel supply system and supplying the evaporated fuel into the cylinder, and an evaporated fuel supply controller for controlling the supply of evaporated fuel into the cylinder in accordance with the execution of torque down control.

14 Claims, 6 Drawing Sheets

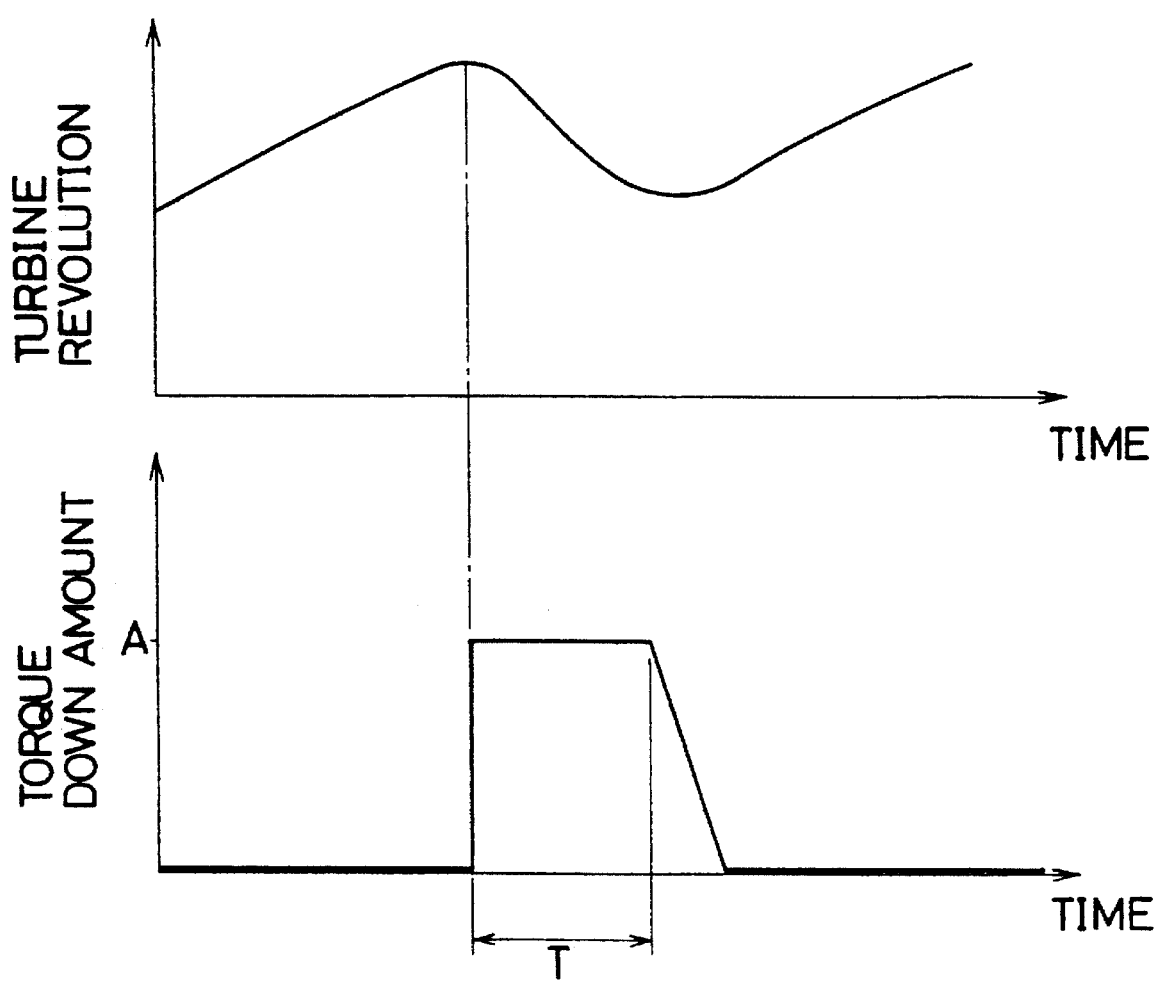

EVAPORATED FUEL CONTROL SYSTEM FOR AN INTERNAL COMBUSTION ENGINE RESPONSIVE TO TORQUE REDUCTION DURING SHIFTING

BACKGROUND OF THE INVENTION

1. Field of the Invention

This invention relates to an evaporated fuel control system for use with an internal combustion engine which is adapted for controlling the amount of evaporated fuel supplied from a fuel tank or an associated fuel supply system to a cylinder or combustion chamber of the internal combustion engine.

2. Description of the Prior Art

A typical fuel supply system of an automotive vehicle comprises a fuel tank equipped with a fuel pump, supply line for supplying fuel from the fuel tank to a fuel injector connected to an end of the fuel supply line which in turn sprays atomized fuel into a combustion chamber. The injector, normally located downstream of the intake air passage close to the cylinder of the internal combustion engine, is directed toward an intake port of the cylinder to spray atomized fuel into the combustion chamber at an appropriate part, e.g., intake stroke, of the engine cycle.

In such a typical fuel system, an upper space of the fuel tank is filled with fuel vapor. This fuel vapor possibly leaks out of the tank through a fuel inflow port. To prevent this leakage, an automotive vehicle is usually provided with an evaporated fuel trap and recycle system. A principal structure of this kind of evaporated fuel trap and recycle system comprises an evaporated fuel line connecting upper space of the fuel tank and an intake air passage, and a canister provided at an intermediate portion of the evaporated fuel line. There further provided a purge valve downstream of the canister. For example, Japanese Unexamined Patent Publication No. 4-136469 discloses such evaporated fuel trap and recycle system.

The canister is generally known as an evaporated fuel absorber or trap device which is usually filled with absorbent such as activated carbon. Evaporated fuel, conveyed from the fuel tank to the canister through the evaporated fuel line, is therefore temporarily trapped by the absorbent in the canister. Thereafter, the fuel desorbs from the absorbent, being propelled by operation of the internal combustion engine. After passing through the intake air passage, the evaporated fuel is introduced into a cylinder of the engine together with intake air. The purge valve is controlled to adjust its opening degree.

Now, recently advanced automotive vehicles have a torque down control system by which the engine is driven with extremely small engine torque during idling operation or when the vehicle is cruising on a descending road. Also, the torque down control is executed in cooperation with an automatic traction control device of the automotive vehicle to suppress slip of wheels promptly. The former torque down control will be executed for fuel saving. The latter torque down control will executed for slip control.

Further, in an internal combustion engine connected with an automatic transmission, to reduce the shifting shock, a torque down control is executed when the gear ratio is being shifted.

As one of the torque down control, fuel cut operation is performed. According to a typical fuel cut operation, an engine is partially fired. Specifically, a specified number of cylinders are excluded from fuel supply. Japanese Unexamined Patent Publication No. 3-67042 discloses a vehicle traction control wherein such fuel cut operation is performed in cooperation with a slip control device.

As another torque down control, the ignition timing is retarded. Specifically, the ignition timing for each cylinder is retarded by a predetermined amount or a predetermined crank angle to decrease the engine torque.

Returning to the evaporated fuel control, a conventional control of evaporated fuel is carried out in such a manner that the opening degree of the purge valve is automatically adjusted in accordance with the engine speed. Alternatively, the purge valve is controlled in accordance with nature of volatile components of fuel as shown in Japanese Unexamined Patent Publication No. 4-136469.

In the torque down control, as mentioned above, the internal combustion engine is not always operated with full cylinders. Some cylinders are forcibly held off or the ignition timing is retarded to accomplish the torque down effect in an idling, slip control, gear ratio shifting or the like. The combustion is unstable in such an engine operating condition.

However, the conventional evaporated fuel supply control is carried out in non-connection with the torque down control. Accordingly, the event has often occurred that the torque down is insufficiently attained, or the after-burning phenomenon is induced undesirably.

It has been well known that the fuel amount sprayed from the injection nozzle can be controlled precisely by regulating the injection nozzle. However, it has been very difficult to finely control the amount of evaporated fuel flowing into the intake passage because of the vapor state. Accordingly, it will be apparent that in such special engine operation condition as torque down control which requires fine fuel amount control, it is preferable to regulate the injection nozzle only while inhibiting the evaporated fuel supply.

In the conventional torque down control of fuel cut operation, some of cylinders are excluded from fuel supply to reduce the engine torque when wheel slip is detected. The fuel supplied to the remaining cylinders is caused to be lean to reduce the total amount of unburnt carbon monoxide or hydrocarbon components in the exhaust gas, and to keep the exhaust gas passage from the after-burning phenomenon even if the exhaust gas is mixed with oxygen rich exhaust gas scavenged from the fuel-cut cylinders, and to suppress the rise of temperature of the exhaust passage. This is advantageous particularly in an engine equipped with an exhaust gas purification system including a catalyst in that the catalyst is liable to deteriorate in high temperature environment.

However, the evaporated fuel is supplied irrespective of the fuel cut operation. Consequently, the evaporated fuel is mixed with the lean fuel-air mixture, and the above-mentioned effect of lean fuel-air mixture is weakened. This is because the air-fuel ratio of the lean fuel-air mixture shifts to a richer value due to the undesirable addition of evaporated fuel. With the undesirable shift of air-fuel ratio, the torque down is no longer accomplished properly or the after-burning phenomenon is likely to occur in the exhaust gas passage. The after-burning phenomenon will cause deterioration of valuable catalyst.

In the conventional torque down control of ignition timing retard, also, the evaporated fuel is supplied into the combustion chamber irrespective of the ignition timing retarding. This will cause the fuel to be rich more than the necessary value, and involve the after-burning phenomenon.

SUMMARY OF THE INVENTION

It is an object of the present invention to provide an evaporated fuel control system for use with an internal combustion engine which has overcome the above-mentioned problems residing in the prior art.

It is another object of the present invention to provide an evaporated fuel control system for use with an internal combustion engine which can adequately control the supply of evaporated fuel into internal combustion cylinders in connection with execution of torque down control.

According to the present invention, an evaporated fuel control system for use with an internal combustion engine having a cylinder, a fuel supply system for supplying fuel into the cylinder, and torque down control means for executing torque down control at a predetermined condition, the evaporated fuel control system comprising: evaporated fuel supply means for trapping fuel evaporated from the fuel supply system and supplying the evaporated fuel into the cylinder; and evaporated fuel supply control means for controlling the supply of evaporated fuel into the cylinder in accordance with the execution of torque down control.

The torque down control means may be provided with means for executing a fuel cut operation of cutting off the fuel supply to a specified cylinder of the plurality of cylinders, or means for executing an ignition timing retard operation of retarding the ignition timing of a specified cylinder of the plurality of cylinders.

Also, the evaporated fuel supply means may be provided with a supply line for guiding the evaporated fuel from the fuel supply system to an intake air passage of the internal combustion engine, and the evaporated fuel supply control means may be constructed by a purge valve provided in the supply line for regulating the supply of evaporated fuel to the intake air passage; and means for activating the purge valve to reduce the supply of evaporated fuel into the intake air passage when torque down control is executed. It may be appreciated to render the torque down control execute at a plurality of levels, and activate the purge valve to reduce the supply of evaporated fuel in proportion with a rise in the torque down level. Further, it may be appreciated to provide a memory for storing the plurality of torque down levels.

Also, the evaporated fuel supply control may be provided with means for inhibiting the supply of evaporated fuel into the cylinder. The inhibiting means may be provided with a purge valve provided in the supply line for closing and opening the supply line: and means for activating the purge valve to close the supply line when torque down control is executed.

It may be appreciated to render the torque down control when the automotive vehicle provided with the internal combustion engine causes wheel slip. The torque down control means may be provided with means for setting torque down levels corresponding to degrees of slippage of wheel. Further, the torque down control means may be provided with detection means for detecting the wheel slip; fuel cut designation means for calculating a slippage degree for the detected wheel slip to set a torque down level, and designating a combination of fuel cut cylinder on the basis of the set torque down level.

It may be appreciated to render the torque down control when the automatic transmission is in the process of gear ratio shifting. Further, it may be preferable to provide a sensor for detecting the revolution number of a turbine of the automatic transmission, and render the torque down control during a specified time immediately after a decrease in the turbine revolution starts.

The above and other objects, features and advantages of the present invention will become more apparent from the following detailed description which is to be read in conjunction with the accompanying drawings.

BRIEF DESCRIPTION OF THE DRAWINGS

FIG. 4 is a graph showing a relationship between a variation in the revolution number of a turbine of the automatic transmission system and a variation in the torque down amount.

DETAILED DESCRIPTION OF THE PREFERRED EMBODIMENTS OF THE INVENTION

A preferred embodiment of the present invention will be described in detail with reference to accompanying drawings.

Figure 1:
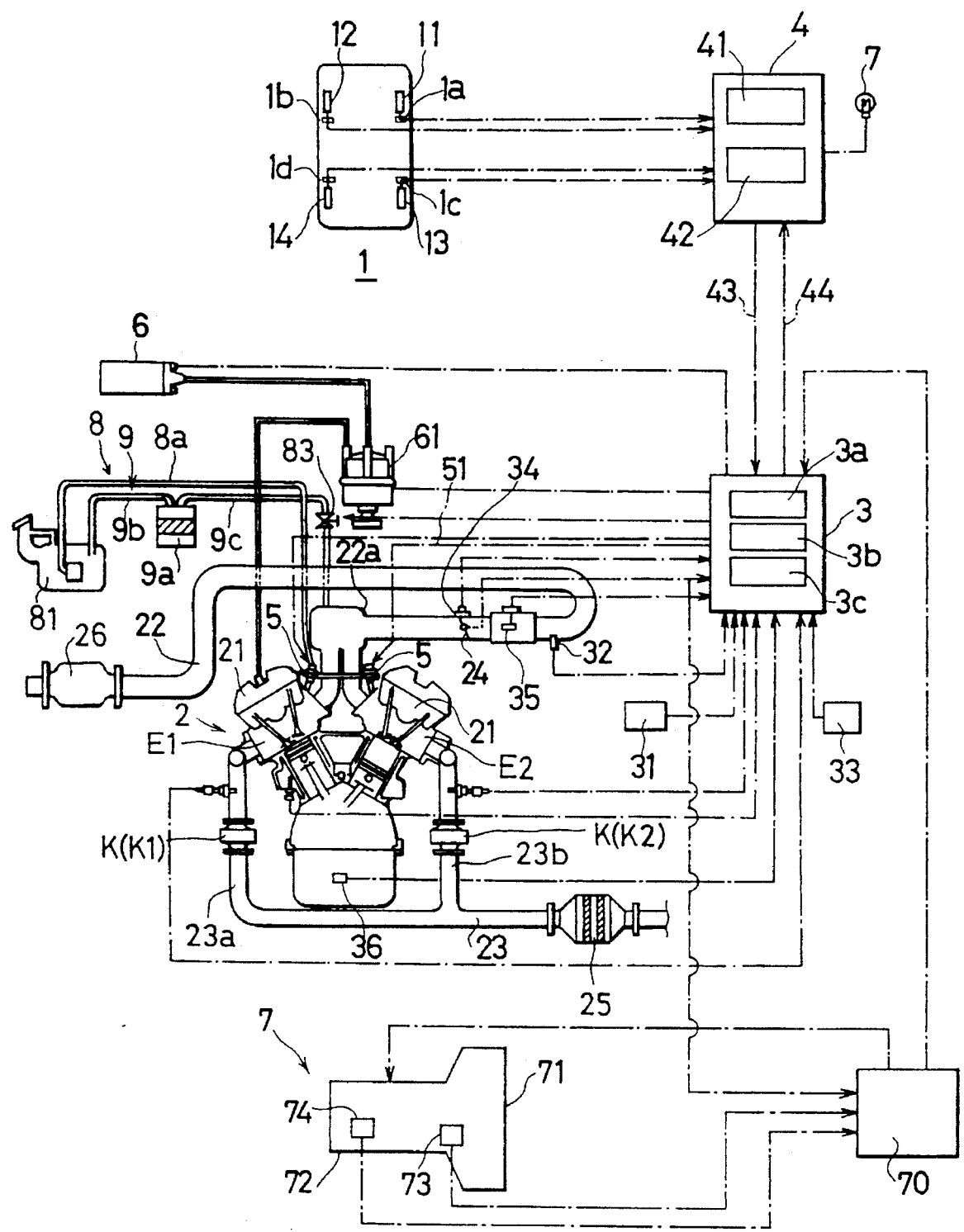
FIG. 1 is a schematic diagram illustrating an evaporated fuel control system embodying the present invention which is combined with an internal combustion engine control system, a traction control system, and an automatic transmission system.

FIG. 1 is a schematic diagram illustrating an evaporated fuel control system together with an internal combustion engine control system, a traction control system, and an automatic transmission in accordance with the present invention. As shown in this drawing, an automotive vehicle 1 comprises an internal combustion engine 2 qualifying as a driving source, an engine controller 3 for controlling the internal combustion engine 2, a traction controller 4 for controlling the driving torque of front wheels 11 and 12, i.e. drive wheels, an automatic transmission 7, and an automatic transmission controller 70 for controlling the gear ratio shifting of the automatic transmission 7.

The traction controller 4 executes a traction control including a torque down control to be described later. Also, the automatic transmission controller 70 is adapted for executing a torque down control to be described later addition to the gear ratio shifting control.

Although the automotive vehicle 1 and the internal combustion engine 2 are illustrated separately in FIG. 1, it is needless to say that the internal combustion engine 2 is installed in an engine room of the automotive vehicle 1. A reciprocating motion of the engine piston is transmitted to the front wheels 11 and 12 through a crank shaft (not shown) and a power transmission mechanism (not shown) including the automatic transmission 7. In this embodiment, engine drive force is not transmitted to rear wheels 13 and 14, i.e., driven wheels. It is needless to say that the engine drive force can be transmitted to the rear wheels 13 and 14 instead of the front wheels 11 and 12.

Figure 2:
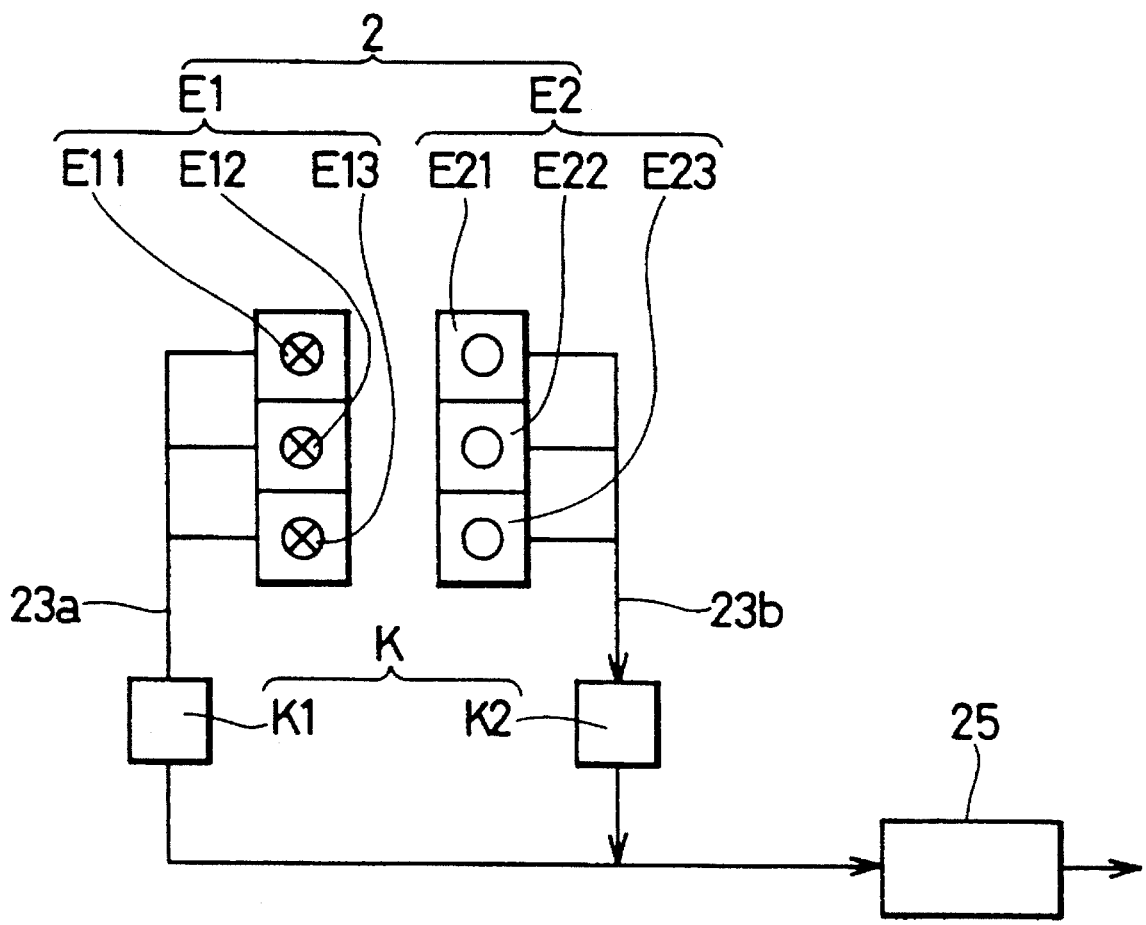
FIG. 2 is a diagram schematically illustrating an operating slate of the internal combustion engine under a torque down control.

FIG. 2 is a diagram schematically showing an operating state of the internal combustion engine 2 in a specific condition. As shown in FIGS. 1 and 2, the internal combustion engine 2 is a V-shape engine which comprises a plurality of cylinders evenly separated on two banks thereof. Namely, the cylinders of the V-shape engine 2 are divided into two, first and second, cylinder groups E1 and E2. The first cylinder group E1 consists of three in-line cylinders E11, E12, and E13, while the second cylinder group E2 consists of three in-line cylinders E21, E22, and E23. Each of first and second cylinder groups E1 and E2 is connected to an intake air passage 22 through a cylinder head 21 disposed on the cylinders. An upstream end of the intake air passage 22 is connected to an air filter 26, through which purified fresh air is introduced into the cylinders E11 to E23 through the intake air passage 22. On the other hand, a fuel injection nozzle 5, i.e. fuel injector, is provided at the downstream end of the intake air passage 22 close to the cylinder head 21. A main fuel supply system 8 is adapted for supplying the fuel injection nozzle 5 with fuel. The fuel injection nozzle 5 sprays the fuel into the intake air passage 22.

The main fuel supply system 8 comprises a fuel tank 81, a fuel supply pipe 8a connecting the fuel tank 81 and the fuel injection nozzle 5. The fuel tank 81 is equipped with a fuel pump. By the operation of this fuel pump, fuel is supplied to the fuel injection nozzle 5 through the fuel supply pipe 8a. Upon activation of the fuel injection nozzle 5, a predetermined amount of fuel is sprayed from the fuel injection nozzle 5 and introduced into the cylinder of the engine 2. The spraying amount of fuel from the injection nozzle 5 is controlled by a main fuel supply control unit 3a of the engine controller 3.

In this embodiment, the fuel injection nozzle 5 is an electronic type, which accommodates a built-in electromagnetic injector. This electromagnetic injector opens its injection hole in accordance with an engine load at an appropriate part (intake stroke) in the engine cycle. The engine load is represented, for example, by an intake air amount introduced in the intake air passage 22. The fuel injection amount is generally determined in terms of an electric pulse width applied to the electromagnetic injector.

Accordingly, a part of fuel fed from the fuel pump of the fuel tank 81 is supplied into the intake air passage 22 in response to the activation of the fuel injection nozzle 5. The remainder of fuel is returned to the fuel tank 81 by way of a return pipe (not shown). Although not shown in the drawing, there is further provided a pressure regulator valve for adjusting the pressure in the main fuel supply system 8.

Further, there is provided an evaporated fuel supply system 9 comprises a first line 9b having one end connected to the fuel tank 81 and the other end connected to a canister 9a, and a second line 9c having one end connected to the canister 9a and the other end connected to a surge tank 22a. The surge tank 22a is provided at an intermediate portion of the intake air passage 22 upstream of the fuel injection valve 5. The surge tank 22a is an enlarged portion having a significant volume required to suppress surging of intake air. The canister 9a, disposed between the first and second lines 9b and 9c, is an absorber or trap device having an inside space filled with activated charcoal. Evaporated fuel gathered in the upper space of the fuel tank 81 is guided in the canister 9a when the engine 2 is stopped, and trapped by the absorbent in the canister 9a temporarily. Thereafter, the evaporated fuel desorbs from the absorbent in the canister 9a, and is then supplied into the cylinders E11 to E23 through the surge tank 22a.

In the evaporated fuel supply system 9, a purge valve 83 is provided at an intermediate portion of the second line 9c. The purge valve 83 is controlled or closed or opened by an evaporated fuel supply control unit 3b provided in the engine controller 3 to regulate the supply of evaporated fuel into the surge tank 22a.

Accordingly, intake air introduced into the intake passage 22 is accompanied by evaporated fuel supplied from the second line 9c to the surge tank 22a. Thereafter, this intake air is mixed with atomized fuel sprayed from the fuel injection valve 5, which is supplied from the fuel supply pipe 8a. The air-fuel mixture is thus formed and is then introduced into the cylinders E11 to E23, thereby causing reciprocating motion of the engine piston as a result of combustion of the gas mixture in the combustion chamber. Burnt gas mixture is, subsequently, scavenged through a first exhaust gas passage 23a connected to the first cylinder group E1 and a second exhaust gas passage 23b connected to the second cylinder group E2. These first and second exhaust gas passages 23a and 23b are merged into a main exhaust gas passage 23 at the downstream thereof. After passing through the main exhaust gas passage 23, the exhaust gas is emitted out of the engine 2.

The main fuel supply system 8 is controlled by the main fuel supply control unit 3a of the engine controller 3. Accordingly, various sensors are associated with this main fuel supply control unit 3a. For example, an ambient pressure sensor 31, an intake air temperature sensor 32, a cooling water temperature sensor 33, a throttle sensor 34, an intake air flow sensor 35, and an engine speed sensor 36 are connected to the engine controller 3 to provide engine operational information. On the basis of these information obtained, the main fuel supply control unit 3a executes predetermined calculations in accordance with a predetermined program. The fuel supply to the internal combustion engine 2 is carried out appropriately in the combination of the main fuel supply control unit 3a and evaporated fuel supply control unit 3b.

The intake air passage 22 is equipped with a throttle valve 24 at an intermediate portion thereof. This throttle valve 24 is open-close controlled in response to an, acceleration amount given by driver's manipulation. An intake air amount supplied to each cylinder groups E1 and E2 is determined by the opening degree (Od) of the throttle valve 24. In other words, the fuel amount proportional to the intake air amount is supplied into the cylinders of the internal combustion engine 2.

The exhaust gas passages include exhaust gas purificators K. Namely, the first exhaust gas passage 23a is equipped with a first exhaust gas purificator K1, and the second exhaust gas passage 23b is equipped with a second exhaust gas purificator K2. Furthermore, the main exhaust gas passage 23 is equipped with a rear exhaust gas purificator 25. The gas mixture, introduced into the cylinders E11 to E23, causes combustion in the respective combustion chambers of the cylinders E11 to E23 upon spark discharge of an ignition plug (not shown) in each cylinder. An ignition coil 6 supplies the ignition plug with high voltage through a distributor 61.

The engine controller 3 is adapted for optimizing the operation condition of the internal combustion engine 2 in view of environmental conditions. A micro computer normally constitutes this engine controller 3, and generates appropriate control commands in accordance with a predetermined program and information representing environmental conditions.

In this embodiment, torque down operation of the internal combustion engine is carried out in such a manner that predesignated cylinders are supplied with no fuel or ignition timings of these cylinders are retarded upon establishment of predetermined torque down conditions. In addition, control of the evaporated fuel is carried out in such a manner that the supply amount of the evaporated fuel is sufficiently decreased under such torque down conditions.

To suppress the amount of the evaporated fuel supplied to the engine cylinders, the evaporated fuel supply control unit 3b decreases an opening degree of the purge valve 83 when the torque down conditions are established to reduce the supply of evaporated fuel passing through the purge valve 83 correspondingly.

In this embodiment, one of the torque down conditions is defined as a case where the automotive vehicle causes slip of wheels and the internal combustion engine is in a stable condition capable of executing the torque down operation. More specifically, the stable condition is defined as the engine speed is in a range of 1000 to 6500 rpm. Hereinafter, the torque down control for suppressing slip of wheels will be described.

When the above torque down condition is satisfied, no fuel is supplied to specified ones of the cylinders E11 to E23. A gas mixture of lean air-fuel ratio is supplied to the remainder of the cylinders E11 to E23. If the engine 2 causes unstable combustion, the air-fuel ratio of the lean gas mixture will be shifted to a richer ratio. To execute such a control, the engine controller 3 includes the engine torque control unit 3c.

The engine torque control unit 3c receives information sent from various sensors (31–36) described above, and checks whether the torque down condition is established or not. If the torque down condition is established, the engine torque control unit 3c generates a torque down command, thereby executing the fuel cut operation of the engine 2.

To control engine torque, the engine torque control unit 3c generates an ignition pulse signal 51. Namely, the ignition pulse signal 51 is set at 0 to the fuel-cut cylinders. The number of the fuel-cut cylinders is predetermined in accordance with the torque down amount required. When received this ignition pulse signal 51, the fuel injection nozzle 5 is deactivated and, therefore, no fuel is supplied in the corresponding cylinder. Thus, the engine torque is reduced in proportion to the number of fuel-cut cylinders. The air-fuel ratio of the lean gas mixture, supplied to the remaining cylinders other than the fuel-cut cylinders, can be adjusted by varying the pulse width of the above ignition pulse signal 51 so that fuel is reduced than usual.

FIG. 2 schematically shows the operating state of the internal combustion engine 2 wherein one of the cylinder groups E1 and E2 is in an operative condition supplied with lean gas mixture and the other is in an inoperative condition. In this case, the first cylinder group E1 (i.e. E11, E12, and El3) is inoperative and the second cylinder group E2 (i.e. E21, E22, and E23) is operative. This condition may be referred to as a one-handed bank condition. Such a one-handed bank condition is preferably applied when the engine 2 is cold and its speed is low. The combustion state is not stable when the engine temperature is low. Therefore, a relatively large amount of burnable components are exhausted from the operative cylinders. To prevent afterburning phenomenon, these burnable components needs to be separated not to be mixed with oxygen rich gas exhausted from the inoperative cylinders. In accordance with the arrangement of this embodiment, flow of the burnable components is guided by the second exhaust gas passage 23b while flow of the oxygen rich gas is guided by the first exhaust gas passage 23a. Thus, the burnable components are surely separated from the oxygen rich gas until reaching the purificator K.

Besides the above-described one-handed bank fuel-cut operation, the fuel cut operation can be realized by deactivating selected cylinders on both banks. Such a fuel cut operation is preferable when the engine is cold and its speed is high. The combustion state of the engine 2 is stable if the engine speed is high regardless of the low engine temperature. The burnable components exhausted are very few. Thus, no after-burning phenomenon will occur in each of the bifurcated exhaust gas passages 23a and 23b. There is no fear that the burnable components are mixed with oxygen rich gas. In other words, high temperature deterioration of the purificators K is surely prevented.

First, a torque down control on the basis of wheel slippage will be described. The traction controller 4 makes a judgment as to whether the slippage is greater than a predetermined value. If the slippage exceeds this predetermined value, the traction controller 4 calculates a control level in accordance with the slippage. For this calculation, the front wheels 11 and 12 are equipped with right and left wheel rotational speed sensors 1a and 1b, respectively. In the same manner, the rear wheels 13 and 14 are equipped with right and left rotational speed sensors 1c and 1d, respectively.

Specifically, rotational speeds, detected by the above wheel rotational speed sensors 1a, 1b, 1c, and 1d, are inputted into the traction controller 4. A slip detecting unit 41 in the traction controller 4 detects whether the slip of wheels occurs or not. This detection is carried out by comparing the rotational speeds of the front wheels (i.e. drive wheels) 11, 12 and the rotational speed of the rear wheels (i.e. driven wheels) 13, 14. Namely, it is judged that the slip occurs when the rotational speed of the front wheels (i.e. drive wheels) 11, 12 are excessively large compared with the rotational speed of the rear wheels (i.e. driven wheels) 13, 14.

The traction controller 4 further includes a fuel-cut designation unit 42 for calculating a degree of slippage based on the detected slip, and designating a preferable combination of fuel-cut cylinders in accordance with the calculated slippage degree.

TABLE 1 shows fuel-cut numbers representing fuel cut cylinders determined in view of the engine temperature and the engine speed.

TABLE 1

| TEMP. | SPEED (RPM) | TORQUE DOWN LEVEL | | | | | | | | | | | |
|---|---|---|---|---|---|---|---|---|---|---|---|---|
| | | 1 | 2 | 3 | 4 | 5 | 6 | 7 | 8 | 9 | 10 | 11 | 12 |
| LOW | 0–3500 | 0 | 0 | 0 | 4 | 4 | 5 | 5 | 6 | 6 | 7 | 7 | 7 |
| LOW | 3500–5000 | 0 | 0 | 2 | 3 | 3 | 5 | 5 | 6 | 6 | 7 | 7 | 7 |
| LOW | 5000 < | 0 | 1 | 2 | 3 | 3 | 5 | 5 | 6 | 6 | 7 | 7 | 7 |
| HIGH | 0–5000 | 0 | 0 | 2 | 2 | 2 | 3 | 3 | 5 | 5 | 6 | 7 | 7 |
| HIGH | 5000 < | 0 | 0 | 2 | 2 | 3 | 3 | 5 | 5 | 6 | 6 | 7 | 7 |

In TABLE 1, each of fuel-cut numbers 1 to 7 represents a combination of fuel-cut cylinders, which is shown in more detail in TABLE 2.

In TABLE 1. the degree of torque down is classified into twelve levels in each of various engine operational conditions. These twelve torque down levels are related to the degree of slippage. The greater the number of torque down level is, the larger the degree of slippage is. TABLE 1 is memorized in the cut-fuel designation unit 42.

TABLE 2 shows a detail of the combination of fuel-cut cylinders in conjunction with the fuel-cut numbers in TABLE 1.

TABLE 3

| TEMP. | SPEED (RPM) | TORQUE DOWN LEVEL | | | | | | | | | | | |
|---|---|---|---|---|---|---|---|---|---|---|---|---|---|
| | | 1 | 2 | 3 | 4 | 5 | 6 | 7 | 8 | 9 | 10 | 11 | 12 |
| LOW | 0–3500 | 5 | 12 | 18 | 0 | 0 | 0 | 0 | 0 | 0 | 0 | 0 | 0 |
| LOW | 3500–5000 | 5 | 12 | 0 | 0 | 0 | 0 | 0 | 0 | 0 | 0 | 0 | 0 |
| LOW | 5000 < | 5 | 0 | 0 | 0 | 0 | 0 | 0 | 0 | 0 | 0 | 0 | 0 |
| HIGH | 0–5000 (*) | 5 | 12 | 0 | 0 | 10 | 0 | 10 | 0 | 10 | 0 | 0 | 0 |
| HIGH | 5000 < (*) | 5 | 5 | 0 | 0 | 0 | 0 | 0 | 0 | 0 | 0 | 0 | 0 |
| HIGH | 0–5000 | 10 | 15 | 0 | 0 | 14 | 0 | 15 | 0 | 19 | 0 | 0 | 0 |
| HIGH | 5000 < | 10 | 0 | 0 | 0 | 0 | 0 | 0 | 0 | 0 | 0 | 0 | 0 |

TABLE 2

| FUEL-CUT NUMBER | CYLINDER NUMBER | | | | | | |
|---|---|---|---|---|---|---|---|
| | E11 | E21 | E12 | E22 | E13 | E23 | |
| "0" | 0 | 0 | 0 | 0 | 0 | 0 | NO FUEL CUT |
| "1" | X | 0 | 0 | 0 | 0 | 0 | ⅙ FUEL CUT |
| "2" | X | 0 | 0 | X | 0 | 0 | 2/6 FUEL CUT |
| "3" | X | 0 | 0 | X | X | 0 | 3/6 FUEL CUT |
| "4" | X | 0 | X | 0 | X | 0 | 3/6 FUEL CUT |
| "5" | X | X | 0 | X | X | 0 | 4/6 FUEL CUT |
| "6" | X | X | X | X | X | 0 | 5/6 FUEL CUT |
| "7" | X | X | X | X | X | X | 6/6 FUEL CUT |

In TABLE 2, the mark "0" indicates the operative condition (no fuel cut) while the mark "X" indicates the inoperative condition (fuel cut).

In TABLE 2, for example, in the case of the fuel-cut number "3", the cylinders E11, E22, and E13 are inoperative and the cylinders E21, E12 and E23 are operative. Thus, three of the six cylinders are supplied with no fuel.

The fuel-cut designation unit 42 generates an FC signal, i.e. fuel-cut signal, on the basis of TABLEs 1 and 2 of the fuel-cut designation unit 42. The FC signal designating fuel-cut cylinders, is transmitted from the fuel-cut designation unit 42 to the engine controller 3.

The FC signal is a signal in the form of pulses having a variable duty ratio. The fuel-cut numbers are differentiated by varying the duty ratio of the FC signal. When such an FC signal 43 is transmitted to the engine controller 3, the engine torque control unit 3c of the engine controller 3 transforms the FC signal 43 into a pulse signal 51. The pulse signal 51 is subsequently sent to the fuel injection nozzle 5 to execute the torque down control of the internal combustion engine 2 in accordance with the degree of slippage.

In addition to the fuel cut control, this embodiment carries out the ignition timing adjustment. This ignition timing adjustment is basically carried out in such a manner that a fundamental ignition timing is first determined on the basis of the engine operational conditions and then this fundamental ignition timing is retarded in accordance with the slip condition. The following TABLE 3 shows retard amounts in terms of a crank angle which are determined in consideration of the engine temperature and engine speed.

In TABLE 3. the mark (*) indicates that air-fuel ratio is not adjusted to be lean.

With TABLE 3, for example, in the case that the engine temperature is low and the engine speed is in a range of 3500–5000 rpm., the ignition retard amount becomes "12 degrees (crank angle)" at the torque down level "2". This retard amount is transmitted from the engine controller 3 to the ignition plug to obtain an optimum operating condition of the internal combustion engine 2.

In this slip control including the torque down operation, there will be an occasion that the torque down is improper. In this embodiment, the torque down control is inhibited under the following cases: a case where an ambient pressure detected by the ambient pressure sensor 31 is out of a predetermined range; and a case where an intake air temperature detected by the intake air temperature sensor 32 is abnormal.

The engine torque control unit 3c in the engine controller 3 always checks whether or not the torque down condition is establish on the basis of the data from the sensors. When the torque down condition is satisfied, the engine torque control unit 3c generates a command signal for executing the torque down control.

Further, in addition to the torque down inhibition based on the abnormality of ambient pressure and intake air temperature, it may be appreciated to inhibit the torque down operation if a maloperation occurs in the traction controller 4. More specifically, in this embodiment, the FC signal is transmitted from the fuel-cut designation unit 42 to the engine torque control unit 3c at a period of 8 milliseconds. If the engine torque control unit 3c receive no FC signal within a specified interval, e.g., 8 milliseconds ±10%, it is temporarily judged that a maloperation occurs in the traction controller 4. Unless a maloperation is judged to occur consecutively three times, the temporary maloperation judgment is ignored. However, if such maloperation judgment continues more than three times, it is finally judged that an maloperation actually occurs in the traction controller 4. The engine torque control unit 3c generates warning signal 44 to the traction controller 4 in response to the maloperation judgment.

The traction controller 4 is equipped with a warning lamp 43, which is turned on when the warning signal is transmitted from the engine torque control unit 3c to the traction controller 4.

Second, the automatic transmission controller 70 will be described. The automatic transmission controller 70 is adapted for executing a torque down control to reduce the shifting shock in the automatic transmission 7. In accordance with the present invention, the supply of evaporated fuel may be regulated or inhibited when executing the torque down control in connection with the automatic transmission.

The automatic transmission controller 70 is associated with the automatic transmission 7. The automatic transmission 7 is a conventional automatic transmission. Specifically, the automatic transmission 7 is constructed by a torque converter 71, gear transmission mechanism 72 including a planetary gear mechanism and frictional elements such as clutches, brakes, and hydraulic circuits for controlling the frictional elements. The frictional elements are engaged or disengaged in predetermined manners by the hydraulic circuits to set the gear transmission mechanism 72 in a desired gear ratio. Such construction is well known. Accordingly, a more detailed description of general construction of the automatic transmission 7 will be omitted.

The automatic transmission 7 is further provided with a turbine sensor 73 for detecting the revolution number (Nt) of a turbine of the torque converter 71, and a speed sensor 74 for detecting the vehicle speed (Vs). The detected revolution number and vehicle speed are sent to the automatic transmission controller 70. Also, the automatic transmission controller 70 receives the signal indicative of the opening degree (Od) of throttle valve from the throttle sensor 34.

The automatic transmission controller 70 carries out the gear ratio shifting in accordance with a predetermined control routine. Specifically, gear ratios are determined by comparing the driving condition of vehicle speed (Vs) and throttle opening degree (Od) with a specified shifting map. When the driving condition changes across a shifting line specified on the map, the automatic transmission controller 70 generates a shifting signal to change the gear transmission mechanism 72 to an appropriate gear ratio.

Further, the automatic transmission controller 70 generates to the engine controller 3 a signal indicative of instructing execution of a torque down control during the gear ratio shifting.

Figure 3A:
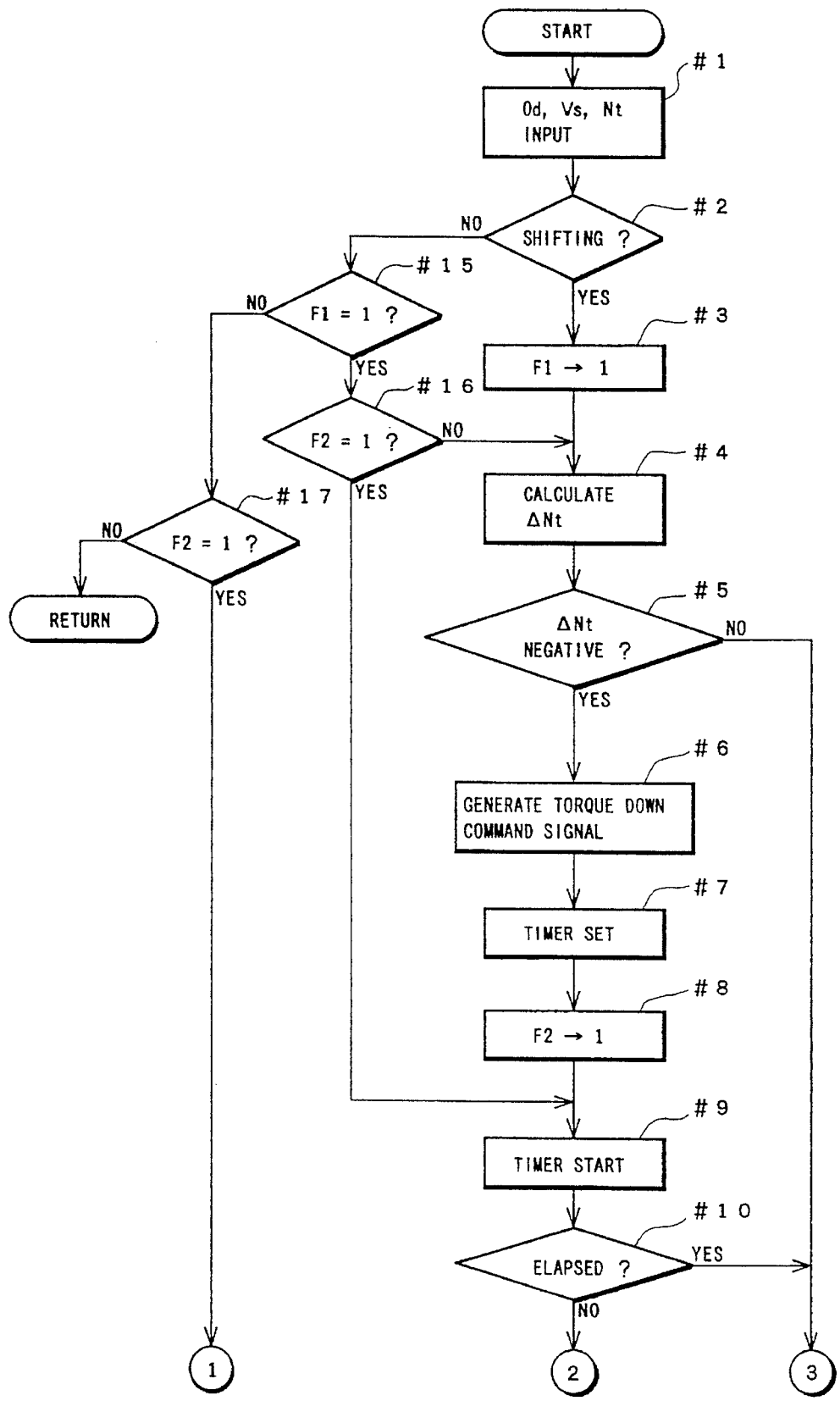
FIGS. 3A and 3B are flowcharts showing an operation of a controller of the automatic transmission system.
Figure 3B:
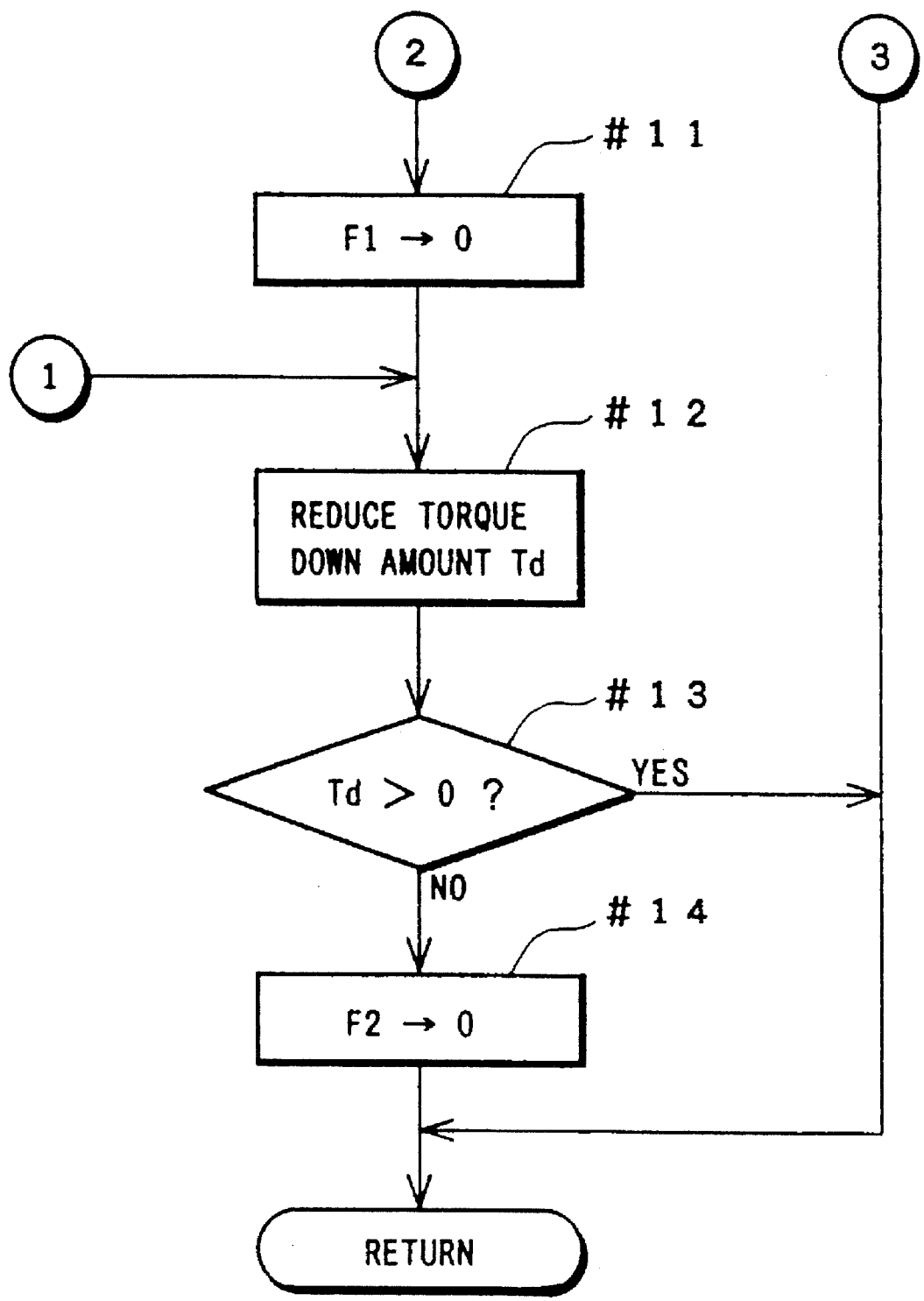

Next, an operation of the automatic transmission controller 70 of generating the torque down signal will be described with reference to flowcharts shown in FIGS. 3A and 3B. First, in Step #1, the detection signal, i.e., (Od), (Vs), (Nt), from each of the throttle sensor 34, turbine sensor 73, and vehicle speed sensor 74 is input to the automatic transmission controller 70. Thereafter, the flow proceeds to Step #2 in which it is judged whether the shifting signal is generated.

If the judgment is YES in Step #2, i.e., the shifting signal is generated, the flow proceeds to Step #3 to set a flag F1 at "1", and then to Step #4. In Step #4, the calculation is executed of calculating a change amount ΔNt between the present revolution number (Nt) and the previous revolution number (Nt). In Step #5, subsequently, it is judged whether the change amount ΔNt is negative.

If the change amount ΔNt not negative, the flow returns to Step #1. On the other hand, if the change amount ΔNt is negative, the flow proceeds to Step #6 in which the torque down amount (Td) is set at a specified value (A) and the torque down command signal having the specified torque down amount (A) is sent to the engine controller 3.

Subsequently, the flow proceeds to Step #7 in which a timer is set at a specified time, and then to Step #8 in which a flag F2 is set at "1". The timer is started in Step #9 and it is judged in Step #10 whether the specified time has elapsed.

If the specified time has elapsed (YES in Step #10), the flow returns to Step #1. If the specified time has not elapsed (NO in Step #10), the flow proceeds to Step #11 in which the flag F1 is reset at "0". In Step #12, thereafter, the torque down amount (Td) is reduced by a specified value.

In Step #13, it is judged whether the reduced torque down amount (Td) is greater than 0. If the torque down amount (Td) is greater than 0, the flow returns to Step #1. If the torque down amount (Td) is not greater than 0, the flow proceeds to Step #15 in which the flag F2 is reset at "0", and then returns to Step #1.

If the shifting signal is not generated (NO in Step #2), the flow proceeds to Step #15 in which it is judged whether the flag F1 has been set at "1". If the flag F1 has been set at "1", the flow proceeds to Step #16 in which it is further judged whether the flag F2 has been set at "1".

If the flag F2 has been set at "1" (YES in Step #16), the flow proceeds to Step #9, and repeats the operations of Steps #9 and #10. If the flag F2 has not been set at "1", that is, the flag F2 is reset, the flow proceeds to Step #4, and repeats the operations of Steps #4 to #10.

In Step #15, if the flag F1 has not been set at "1", the flow proceeds to Step #17 in which it is judged whether the flag F2 has been set at "1". If the flag F2 has been set at "1", the flow proceeds to Step #12, and repeats the operations of Steps #12 and #13. If the flag F2 has been reset at "0" (NO in Step #17), the flow returns to Step #1.

In this flow, after the shifting signal is generated, the torque down amount (Td) is set at the specified value (A) in the lapse of the specified time after a decrease in the turbine revolution starts. After the lapse of the specified time, the torque down amount (Td) is gradually restored to zero.

FIG. 4 shows a relationship between a variation in the turbine revolution and the torque down amount set in the above-mentioned flow. It could be seen that the torque down amount (Td) is maintained at the set value (A) during the specified time T when the turbine revolution down occurs, and is gradually decreased after the lapse of the specified time T.

In this embodiment, the torque down amount (Td) is set at the single specified value (A). However, according to the present invention, it may be appreciated to provide a plurality of set values to enable an optimum torque down amount to be set in accordance with a variation in the engine load during the gear ratio shifting and a gear ratio being shifted.

The evaporated fuel supply control unit 3b controls the purge valve 83 in accordance with the torque down level ("1" to "12") and torque down amount. The opening degree of the purge valve 83 is reduced or closed to reduce or inhibit the supply of evaporated fuel into the intake air passage with increasing torque down level or amount.

Accordingly, the amount of evaporated fuel supplied to the engine 2 is reduced as the torque down level or torque down amount rises. Therefore, even if the combustion state of the engine 2 is unstable due to the fuel cut control or the ignition timing retard, there is no possibility that this unstable combustion state of the engine 2 is worsened by the excessive supply of evaporated fuel. Furthermore, as the air-fuel ratio of the gas mixture is adequately shifted to a leaner ratio, no after-burning phenomenon will occur. Thus, the catalyst is free from high temperature deterioration.

Figure 5:
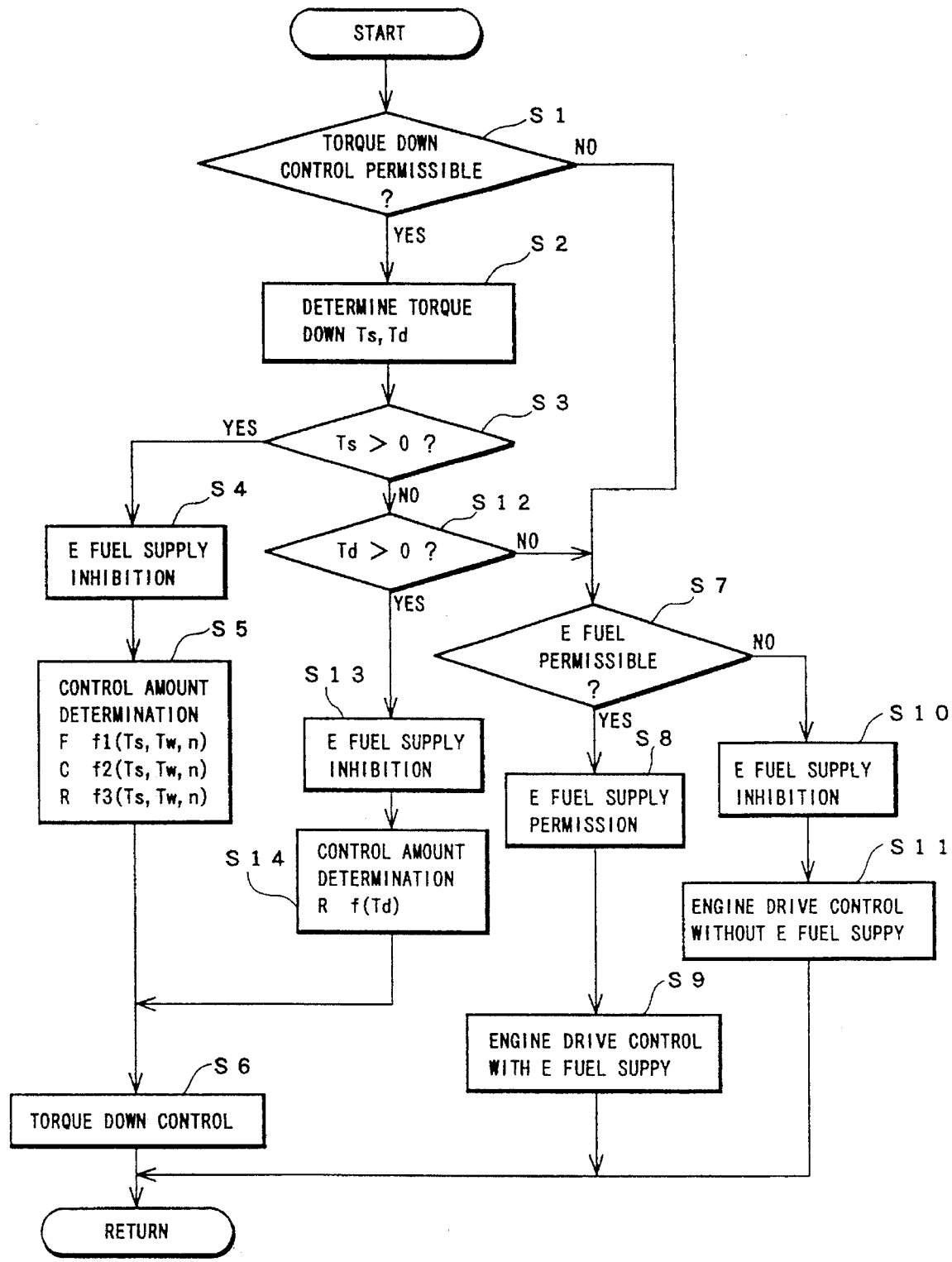
FIG. 5 is a flowchart showing an operation of the evaporated fuel control system.

Hereinafter, an operation of the engine controller 3 will described with reference to a flowchart shown in FIG. 5.

First of all, in Step S1, it is checked whether or not the torque down control is permissible. Specifically, the abnormal judgment is made on the basis of the detected ambient pressure and intake air temperature, or further FC signal interval. The engine speed is detected by the engine speed sensor 36. In this embodiment, the torque down control is judged to be permissible within a range of 1000 to 6500 rpm.

If the judgment is NO in Step S1, i.e. the torque down control is not permissible, the flow proceeds to Step S7 to further judge whether or not the evaporated fuel supply is permissible. The evaporated fuel supply permissible under the following conditions: the engine load is not so large; the engine speed is in a predetermined range; and the engine temperature is more than a predetermined value (e.g., 40° C.).

If the evaporated fuel supply is permissible, the flow proceeds to Step S8 to send an evaporated fuel supply permission signal to the purge valve 83, and subsequently proceeds to Step S9 to execute an engine drive control accompanying the evaporated fuel supply.

If the judgment is NO, i.e., the evaporated fuel supply is not permissible in Step S7, the flow proceeds to Step S10 to send an evaporated fuel supply inhibition signal to the purge valve 83. Upon receipt of the evaporated fuel supply inhibition signal, the purge valve 83 is completely closed. The flow proceeds to Step S11 to execute an engine drive control not including the evaporated fuel supply.

If the judgment is YES in Step S1, i.e. the torque down control is permissible, the flow proceeds to Step S2 to determine a torque down level (Ts) or torque down amount (Td). An appropriate torque down level (Ts) is determined among the twelve levels ("1" to "12") of the TABLE 1 in the fuel-cut designation unit 42, in view of the slippage degree detected by the rotational speed difference between the front wheels 11, 12 and the rear wheels 13, 14. An appropriate torque down amount (Td) is determined by the automatic transmission controller 9.

Subsequently, in Step S3, it is judged whether or not the torque down level (Ts) i s greater than 0. If the judgment is NO in Step S3, the flow proceeds to Step S12. If the torque down level (Ts) is greater than 0, the flow proceeds to Step S4 to send the evaporated fuel supply inhibition signal in the same manner as Step S10. Namely, the evaporated fuel supply inhibition signal is sent to the purge valve 83, upon receipt of which the purge valve 83 is completely closed.

Next, in Step S5, various control amounts are calculated on the basis of the determined torque down level. In more detail, with reference to TABLE 1, an appropriate fuel-cut number (F) is determined on the basis of the torque down level (Ts) , engine temperature (Tw), and engine speed (n).

Further, a fuel correction amount (C) is calculated in accordance with a predetermined equation. The torque down level (Ts), engine temperature (Tw), and engine speed (n) are also used as data for calculation of fuel correction amount (C). The fuel correction is not carried out when using cylinders on only one bank. In other words, fuel having an usual air-fuel ratio is supplied to the cylinders. When using cylinders on the both banks, on the contrary, the fuel correction is carried out to lean the air-fuel ratio.

Furthermore, the ignition retard amount (R) is determined on the basis of TABLE 3, in view of the torque down level (Ts), engine temperature (Tw), and engine speed (n).

Subsequently, the flow proceeds to Step S6 in which the torque down control is executed in accordance with the results determined in Step S5.

On the other hand, if the torque down level (Ts) is not greater than 0, as mentioned above, the flow proceeds to Step S12 in which it is judged whether or not the torque down amount (Td) is greater than 0. If the judgment is NO in Step S12, the flow proceeds to Step S7. On the other hand, if the torque down amount (Td) is greater than 0, the flow proceeds to Step S13 in which the evaporated fuel supply inhibition signal is sent to the purge valve 83 in the same manner as Steps S4 and S10.

The flow further proceeds to Step S14 to calculate control amount on the basis of the determined torque down amount (Td). Specifically, an appropriate ignition retard amount (R) is determined on the basis of the determined torque down amount (Td). Subsequently, the flow proceeds to Step S6 to execute the torque down control in accordance with the result determined in Step S14.

In the above-mentioned flow, when the torque down control executed, the supply of evaporated fuel is entirely inhibited in Steps S4 and S13. However, according to the present invention, in consideration of engine drive conditions, it may be appreciated to reduce the supply of evaporated fuel to an appropriate smaller amount by turning the purge valve to a narrower opening instead of closing the purge valve tightly.

As described above, the evaporated fuel supply is controlled finely in view of engine operational conditions when the torque down control is executed. Therefore, even if the combustion state of the engine is unstable due to the torque down control of fuel cut control or ignition timing retard, the likelihood can be eliminated which such unstable combustion state is worsened by an excessive supply of evaporated fuel. Furthermore, as the air-fuel ratio is adequately shifted to a leaner ratio, no after-burning phenomenon will be prevented. Thus, the catalyst is free from high temperature deterioration.

As this invention may be embodied in several forms without departing from the spirit of essential characteristics thereof, the present embodiment is therefore illustrative and not restrictive, since the scope of the invention is defined by the appending claims rather than by the description preceding them, and all changes that fall within metes and bounds of the claims, or equivalence of such metes and bounds are therefore intended to be embraced by the claims.

What is claimed is:

1. An evaporated fuel control system in a vehicle having an internal combustion engine having:

a cylinder;

a fuel supply system for supplying fuel into the cylinder; and torque down control means for executing torque down control of said internal combustion engine at a predetermined condition, the evaporated fuel control system comprising:
evaporated fuel supply means for trapping fuel evaporated from the fuel supply system and supplying the evaporated fuel into the cylinder; and
evaporated fuel supply control means for controlling the supply of evaporated fuel into the cylinder in accordance with the execution of torque down control.

2. An evaporated fuel control system in accordance with claim 1, wherein:

the internal combustion engine has a plurality of cylinders; and the torque down control means includes means for executing a fuel cut operation of cutting off the fuel supply to a specified cylinder of the plurality of cylinders.

3. An evaporated fuel control system in accordance with claim 1, wherein:

the internal combustion engine has a plurality of cylinders; and the torque down control means includes means for executing an ignition timing retard operation of retarding the ignition timing of a specified cylinder of the plurality of cylinders.

4. An evaporated fuel control system in accordance with claim 1, wherein:

the internal combustion engine has a plurality of cylinders; and the torque down control means includes:
means for executing a fuel cut operation of cutting off the fuel supply to a specified cylinder of the plurality of cylinders; and
means for executing an ignition timing retard operation of retarding the ignition timing of the specified cylinder.

5. An evaporated fuel control system in accordance with claim 1, wherein:

the evaporated fuel supply means includes:
a supply line for guiding the evaporated fuel from the fuel supply system to an intake air passage of the internal combustion engine; and the evaporated fuel supply control means includes:
a purge valve provided in the supply line for regulating the supply of evaporated fuel to the intake air passage; and
means for activating the purge valve to reduce the supply of evaporated fuel into the intake air passage when torque down control is executed.

6. An evaporated fuel control system in accordance with claim 5, wherein:

the torque down control means is operable to provide a plurality of torque down levels; and the activating means activates the purge valve to reduce the supply of evaporated fuel proportionally as the torque down level rises.

7. An evaporated fuel control system in accordance with claim 6, wherein the torque down control means includes a memory for storing the plurality of torque down levels.

8. An evaporated fuel control system in accordance with claim 1, wherein the evaporated fuel supply control means includes means for inhibiting the SUPPLY of evaporated fuel into the cylinder.

9. An evaporated fuel control system in accordance with claim 8, wherein the evaporated fuel supply means includes:
a supply line for guiding the evaporated fuel from a fuel tank of the fuel supply system to an intake air passage of the internal combustion engine; and the inhibiting means includes:
a purge valve provided in the supply line for closing and opening the supply line; and
means for activating the purge valve to close the supply line when torque down control is executed.

10. An evaporated fuel control system in accordance with claim 1, further comprising a wheel driven by the internal combustion engine, wherein the torque down control means executes a torque down control in response to a slippage of the wheel.

11. An evaporated fuel control system in accordance with claim 10, wherein the torque down control means includes means for setting torque down levels corresponding to degrees of slippage of wheel.

12. An evaporated fuel control system in accordance with claim 10, wherein the torque down control means includes:

detection means for detecting the wheel slip;

fuel cut designation means for calculating a slippage degree for the detected wheel slip to set a torque down level, and designating a combination of fuel cut cylinder on the basis of the set torque down level.

13. An evaporated fuel control system in accordance with claim 1, further comprising an automatic transmission operatively connected to said the internal combustion engine, and the torque down control means executes torque down control when the automatic transmission is in the process of gear ratio shifting.

14. An evaporated fuel control system in accordance with claim 13, wherein the torque down control means includes a sensor for detecting the revolution number of a turbine of the automatic transmission, the torque down control means executes torque down control during a specified time immediately after a decrease in the turbine revolution starts.

* * * * *